US008868404B1

(12) United States Patent
Yancey et al.

(10) Patent No.: US 8,868,404 B1
(45) Date of Patent: Oct. 21, 2014

(54) MULTI-TENANT TRANSLATION MEMORY MANAGEMENT

(75) Inventors: Scott William Yancey, San Francisco, CA (US); Craig David Weissman, San Francisco, CA (US)

(73) Assignee: Cloudwords, Inc., San Francisco, CA (US)

( * ) Notice: Subject to any disclaimer, the term of this patent is extended or adjusted under 35 U.S.C. 154(b) by 215 days.

(21) Appl. No.: 13/589,799

(22) Filed: Aug. 20, 2012

(51) Int. Cl.
*G06F 17/28* (2006.01)

(52) U.S. Cl.
CPC ..................................... *G06F 17/28* (2013.01)
USPC ............................................................. 704/7

(58) Field of Classification Search
USPC ...................................................... 704/1–10
See application file for complete search history.

(56) References Cited

U.S. PATENT DOCUMENTS

| | | | | |
|---|---|---|---|---|
| 4,455,602 A | * | 6/1984 | Baxter et al. | 710/5 |
| 4,525,780 A | * | 6/1985 | Bratt et al. | 711/163 |
| 7,593,844 B1 | * | 9/2009 | Takeshita | 704/2 |
| 2007/0265825 A1 | * | 11/2007 | Cancedda et al. | 704/2 |
| 2010/0115424 A1 | * | 5/2010 | Young et al. | 715/753 |

* cited by examiner

*Primary Examiner* — Abul Azad
(74) *Attorney, Agent, or Firm* — Patent Law Offices of Michael E. Woods; Michael E. Woods (57) ABSTRACT

A system, method, and computer-program product providing a customer-centric model of translation memory management including use of relevancy in an on-demand multi-tenant environment, and enabling selective multi-tenant searches for pre-existing translations.

22 Claims, 7 Drawing Sheets

```
<?xml version="1.0"?>
<tmx version="1.4b">
<header
segtype="sentence"
adminlang="en-us"
srclang="EN"
>
<note>This is a note at document level.</note>
</header>
<body>
<tu tuid="0002" srclang="*all*" >
<prop type="Domain">Cooking</prop>
<tuv xml:lang="EN">
<seg>The dog ran</seg>
</tuv>
<tuv xml:lang="ES">
<seg>El perro corrió</seg>
</tuv>
<tuv xml:lang="FR">
<seg>Le chien a couru</seg>
</tuv>
</tu>
</body>
</tmx>
```

MULTI-TENANT TRANSLATION MEMORY MANAGEMENT

FIELD OF THE INVENTION

The present invention relates generally to translation memory management, and more specifically, but not exclusively, to customer-focused on-demand translation memory management.

COPYRIGHT OF INVENTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Concepts and subject matter discussed in the background section is not to be taken as prior art merely as a result of its mention in the background section. Similarly, a problem mentioned in the background section or associated with the subject matter of the background section should not be assumed to have been previously recognized. The subject matter in the background section merely represents different approaches, which in and of themselves may also be inventions.

Many customers have need of a wide range of translation services, such as, for example, developing a website or marketing-related emails in a source language into one or more other target languages. In the simple case, a customer has a document with source text in a first language and desires that it be translated into one or more other languages. Conventionally, the customer contracts with a translation vendor who, directly or indirectly, retains qualified translators to perform the translation(s). The customer receives the translated text and makes whatever use of it that the customer desires. Sometime later, the customer develops a second document to be translated from the first language into the one or more languages previously referenced. That second document may contain significant source text overlap with the previously translated material.

Without translation memory management, the customer may overpay for the resulting translation. Particularly if the customer uses a different translation vendor who performs a complete translation of all the new source text into the desired translation languages. There are some translation memory management tools designed for use by translation vendors which can assist the vendor when performing translations for a single customer. In the example of the second document, in the event that the customer has contracted with a translation vendor that uses a translation memory management tool, it is not always the case that the customer realizes the cost-saving of the tool. Thus there is a need for customer-centric on-demand translation memory management service so the customer can understand and control their translation costs.

Further, conventional localized translation memory management tools do not scale well for centralized on-demand translation memory management. It is common for the collective size of a customer's data in a translation memory to grow larger than physical memory of a computing system. Simple addition of computing resources is at best a temporary solution as the datastore size continues to grow to outsize cost-efficient mechanisms to store and process the data. Operating on the data would become impossible or become ineffective due to an amount of time required for queries, insertions, and other standard operations.

The nature of translation makes proliferation of copies of source and translated text common. These problems are at most inconveniences for local conventional translation memory management tools. Inclusion of duplicates in the datastore only hastens and compounds the problems of scalability for centralized on-demand translation memory management.

Conventional local translation memory management tools do not address issues of relevancy. Translation includes a guiding principle that a translation is of the message of a source text, and not just translation of component segments. A customer will have a first set of translation projects for one audience and a second set of translation projects for another audience. Understanding which content of the translation memory are relevant to the appropriate audiences improves the application of the translation memory management to cost-efficient translation, translation accuracy, and overall correctness of the translation. Managing the translation memory for relevancy across one or more variable dimensions was not necessary for local vendor tools.

Besides the straightforward benefits of providing a customer-centric model of translation memory management with the addition of relevancy in an on-demand multi-tenant environment, an additional benefit of centralized translation memory is that translations may be shared across customers. For customers opting-in, and for suitable non-private content, translation memory of one customer may be made available to other customers of the service, greatly improving the cost-effectiveness and usefulness of the centralized translation memory, particularly when the shared data is relevant and in a similar industry and/or has the same use.

What is needed is a customer-centric on-demand translation memory management service.

BRIEF SUMMARY OF THE INVENTION

Disclosed is a system and method for a customer-centric on-demand translation memory management service. This datastore is scalable to terabytes of data and can be dimensioned across a variety of customer and translation project specific metadata. This datastore is a business quality datastore of translation memory that allows users to dramatically improve the relevancy of their translation memory by selecting subsets based on the dimensions they care about. And increasing relevancy means dramatically lower translation costs, dramatically lower translation time, and dramatically better translation quality. And all of those factors add up to quicker time to market and more revenue and more profit for the customer.

The following summary of the invention is provided to facilitate an understanding of some of technical features related to centralized translation memory management, and is not intended to be a full description of the present invention. A full appreciation of the various aspects of the invention can be gained by taking the entire specification, claims, drawings, and abstract as a whole. The present invention is applicable to other data collections besides translation memory.

A method for managing a translation memory for one or more documents stored on behalf of each of a plurality of tenants, comprising: receiving at a host system, a first plurality of source text segments and a first set of translated text segments associated with the first plurality of source text segments to store on behalf of a first tenant with the first plurality of source text segments representing a first document for the first tenant; storing the first plurality of source text segments and its first set of associated translated text segments to a translation memory management storage in a storage accessible to the host system; and tracking, at the host system, the first plurality of source text segments and its first set of associated translated text segments in the translation memory management storage by a unique identifier assigned to each of the first plurality of source text segments and to each of the first set of associated translated text segments stored in the translation memory management storage; wherein the unique identifiers assigned to the first plurality of source text segments and its first set of associated translated text segments stored in the translation memory management storage are tracked using a portion of a database resident at the host system limited to information of the first tenant; allowing a level of access to be granted to the first plurality of source text segments and its first set of associated translated text segments that allows a plurality of users of the first tenant to at least read the first plurality of source text segments and the first set of associated translated text segments.

Other features, benefits, and advantages of the present invention will be apparent upon a review of the present disclosure, including the specification, drawings, and claims.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

Embodiments of the present invention provide a system and method for a customer-centric on-demand translation memory management service. The following description is presented to enable one of ordinary skill in the art to make and use the invention and is provided in the context of a patent application and its requirements.

Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Translation memory is a by-product of translation and is a collection of the translations received by an organization. Systems and methods are provided for accessing translation memory in an on-demand service. One method embodiment includes receiving a document, its source text segments, and associated translation text segments to store on behalf of a first organization. The content is stored in translation memory management storage. This translation memory management storage may be referred to as a "central depository" in some embodiments. In an embodiment, multiple documents and their translations for multiple organizations are stored in the translation memory management storage. Providing such a "centralized storage" paradigm enables embodiments to ensure that previously translated documents, and relevant portions thereof are discoverable and accessible, across many different users accessing the translation memory management storage service using any number of different computers. Identifiers (ID) are associated with the document and constituent parts when the document is uploaded to the translation memory management storage, source text in common with previously stored source text for a user is logically duplicated and not physically stored, and translated text segments are stored and associated with the proper source text segments. In an embodiment, a query treats all matching source text entries, including duplicated entries, as a single entry and consolidates all associated translated text segments. A tenant is an entity (a person, organization, group of people or other entity) that has an account on the multi-tenant system. The group is a group of people or other entities that have access to the document management storage. The members of a group may be a subset of the members of a tenant, may include multiple tenants, or may include multiple of subsets of different tenants. The documents and associated collective translation memory that are managed by the translation memory management system are stored in the translation memory management storage.

In an embodiment, after a user joins a group, documents and associated translation memory may be accessed from the translation memory management storage by the user's system (e.g., generating queries, browsing content, downloading all or selected portions of the translation memory into the user's desktop, or communicating selected portions of the translation memory to a translation vendor or the like).

In an embodiment, the multiple tenants may share all or portions of their translation memory with other users of the translation memory management system. Users in some embodiments have the option to selectively secure private content while sharing non-private content. Some embodiments provide incentives or other compensation/remuneration for sharing translation memory with other users.

In an embodiment, use of one or more dimensions associated with a document, source text segment, and/or translation text segment enables a user to more efficiently and accurately access their translation memory.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for creating and accessing a translation memory in an on-demand service will be described with reference to example embodiments.

Figure 1:
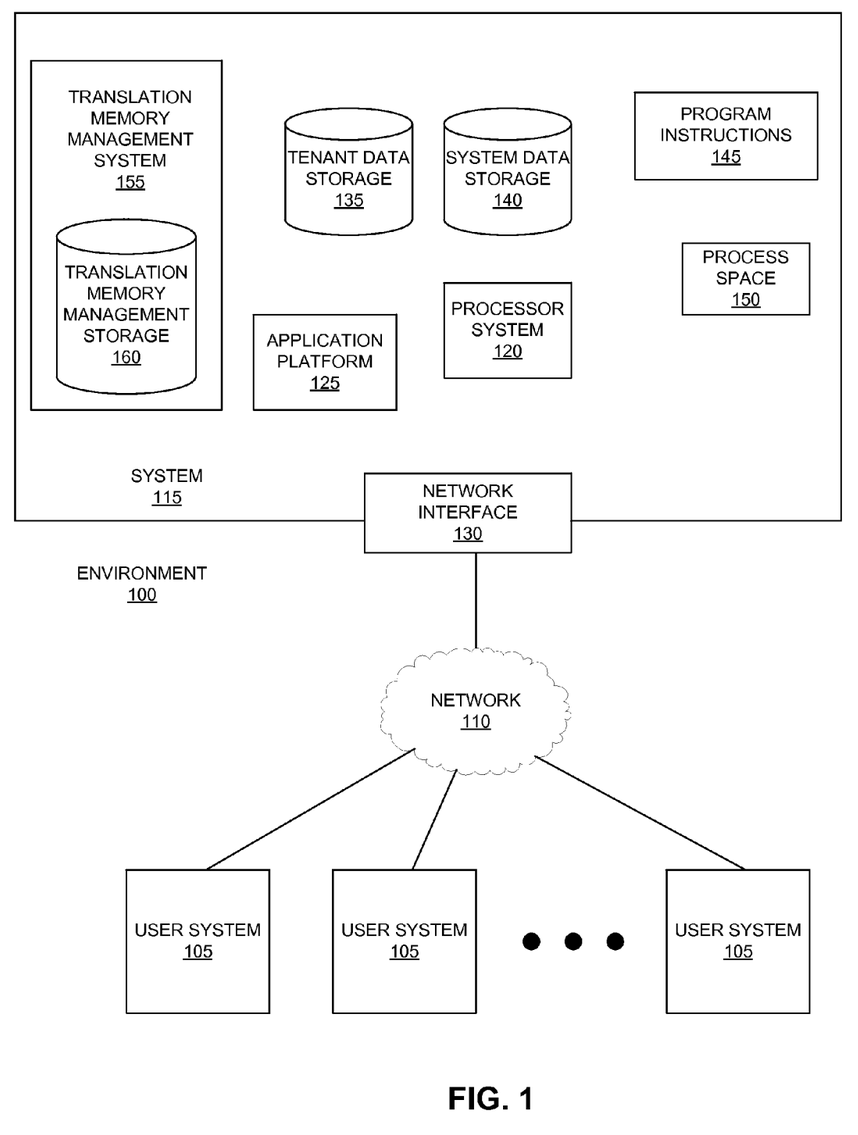
FIG. 1 illustrates a block diagram of an example of an environment wherein an on-demand translation memory management system and database service might be used.

FIG. 1 illustrates a block diagram of an environment 100 wherein an on-demand translation memory management system and database service might be used. Environment 100 may include user systems 105, network 110, system 115, processor system 120, application platform 125, network interface 130, tenant data storage 135, system data storage 140, program instructions 145, process space 150, translation memory management system 155, and translation memory management storage 160. In other embodiments and implementations, environment 100 may not include all of the components identified in FIG. 1 and/or may have one or more other elements instead of, or in addition to, some or all of those identified herein.

Environment 100 is an environment in which an on-demand database service coupled with a translation memory management system exists. User system 105 may be any machine or system that is used by a user to access a database user system. For example, any of user systems 105 may be a handheld computing device, a mobile phone, a laptop computer, a tablet, a smartphone, a workstation, and/or a network of computing devices. As illustrated in FIG. 1 (and in more detail in FIGS. 2 and 3) user systems 105 might interact via a network 110 with an on-demand database service, which is shown as system 115, coupled with a translation memory management system 155 and translation memory management storage 160.

An on-demand database service, such as system 115, is a pre-established database system that is made available to outside users that do not need to necessarily be concerned with building and/or maintaining the database system, but instead may be available for their use when the users need the database system (e.g., on the demand of the users). Some on-demand database services may store information from one or more tenants into tables of a common database image to form a multi-tenant database system (MTS). Accordingly, "on-demand database service 115" and "system 115" will be used interchangeably herein. A database image may include one or more database objects. A relational database management system (RDMS) or the equivalent may execute storage and retrieval of information against the database object(s). Application platform 125 may be a framework that allows the applications of system 115 to run, such as the hardware and/or software, e.g., the operating system. In an embodiment, on-demand database service 115 may include an application platform 125 that enables creation, managing and executing one or more applications developed by the provider of the on-demand database service, users accessing the on-demand database service via user systems 105, or third party application developers accessing the on-demand database service via user systems 105.

The users of user systems 105 may differ in their respective capacities, and the capacity of a particular user system 105 might be entirely determined by permissions (permission levels) for the current user. For example, where a user is using a particular user system 105 to interact with system 115, that user system 105 has the capacities allotted to that user. However, while an administrator is using that user system 105 to interact with system 115, that user system has the capacities allotted to that administrator. In an embodiment, a hierarchical role based model is not used. However, in systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 110 is any network or combination of networks of devices that communicate with one another. For example, network 110 can be any one or any combination of a LAN (local area network), WAN (wide area network), PAN (personal area network), telephone network, wireless network, point-to-point network, star network, token ring network, hub network, or other appropriate configuration. As a common type of computer network in current use is a TCP/IP (Transfer Control Protocol and Internet Protocol) network, such as the global internetwork of networks often referred to as the "Internet," that network will be used in many of the examples herein. However, it should be understood that the networks that the present invention might use are not so limited, although TCP/IP is a frequently implemented protocol.

User systems 105 might communicate with system 115 using TCP/IP and, at a higher network level, use other common Internet protocols to communicate, such as HTTP, FTP, AFS, WAP, and the like. In an example where HTTP is used, user system 105 might include an HTTP client commonly referred to as a "browser" for sending and receiving HTTP messages to and from an HTTP server at system 115. Such an HTTP server might be implemented as the sole network interface between system 115 and network 110, but other techniques might be used as well or instead. In some implementations, the interface between system 115 and network 110 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 115, shown in FIG. 1, implements a web-based translation management (TM) system. For example, in one embodiment, system 115 includes application servers configured to implement and execute TM software applications as well as provide related data, code, forms, webpages and other information to and from user systems 105 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 115 implements applications other than, or in addition to, a TM application. For example, system 115 may provide tenant access to multiple hosted (standard and custom) applications, including translation management, translation memory management, and other applications including those for accessing and managing translations and translation vendors. User (or third party developer) applications, which may or may not include TM, may be supported by the application platform 125, which manages creation, storage of the applications into one or more database objects and executing of the applications in a virtual machine in process space 150 of system 115.

One arrangement for elements of system 115 is shown in FIG. 1, including network interface 130, application platform 125, tenant data storage 135 for tenant data, system data storage 140 for system data accessible to system 115 and possibly multiple tenants, program instructions 145 for implementing various functions of system 115, and process space 150 for executing MTS system processes and tenant-specific processes, such as running applications as part of an application hosting service. Additional processes that may execute on system 115 include database indexing processes. System 115 preferably includes translation memory management system 155, which may include translation memory management storage 160 supporting storage and retrieval of documents and associated source text segments and translated text segments on behalf of tenants whose data is managed and housed by system 115.

Several elements in the system shown in FIG. 1 may include conventional, well-known elements that are explained only briefly here. For example, each user system 105 could include a desktop personal computer, workstation, laptop, PDA, cell phone, tablet, smartphone, portable electronic computing system, or any wireless access protocol (WAP) enabled device or any other computing device capable of interfacing directly or indirectly to the Internet or other network connection. User system 105 typically runs an HTTP client, e.g., a browsing program, such as Microsoft's Internet Explorer browser, Netscape's Navigator browser, Google's Chrome browser, Opera's browser, Apple's Safari, or a WAP-enabled browser in the case of a cell phone, PDA or other wireless device, or the like, allowing a user (e.g., subscriber of the multi-tenant database system) of user system 105 to access, process and view information, pages and applications available to it from system 115 over network 110. Each user system 105 also typically includes one or more user interface devices, such as a keyboard, a mouse, trackball, touch pad, touch screen, pen, Input/Output systems, or the like, for interacting with a graphical user interface (GUI) provided by the browser on a display (e.g., a monitor screen, LCD display, and the like.) in conjunction with pages, forms, applications and other information provided by system 115 or other systems or servers. For example, the user interface device can be used to access data and applications hosted by system 115, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 105 and all of its components are operator configurable using applications, such as a browser, including computer code run using a central processing unit such as an Intel Pentium®, Xeon®, Celeron, Dual Core, Core iX processors, processors from other manufacturers, or the like. Similarly, system 115 (and additional instances of an MTS, where more than one is present) and all of their components might be operator configurable using application(s) including computer code to run using a central processing unit such as processor system 120, which may include an Intel Pentium®, Xeon®, Celeron, Dual Core, Core iX processors, processors from other manufacturers, or the like, and/or multiple processor units. A computer program product embodiment includes a machine-readable storage medium (media) having instructions stored thereon/in which can be used to program a computer to perform any of the processes of the embodiments described herein. Computer code for operating and configuring system 115 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any non-transitory media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), quantum memory, or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 115 is configured to provide webpages, forms, applications, data and media content to user (client) systems 105 to support the access by user systems 105 as tenants of system 115. As such, system 115 provides security mechanisms to keep each tenant's data separate unless the data is shared. When more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 2:
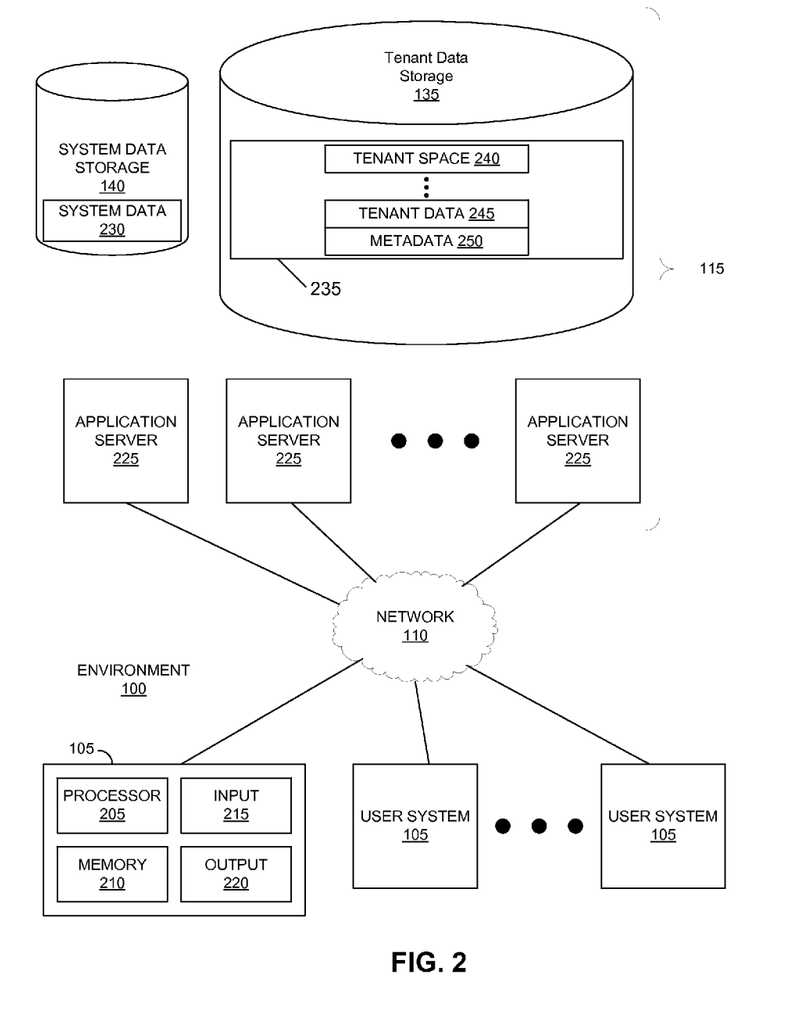
FIG. 2 illustrates a block diagram of an embodiment of elements of FIG. 1 and various possible interconnections between these elements.
Figure 3:
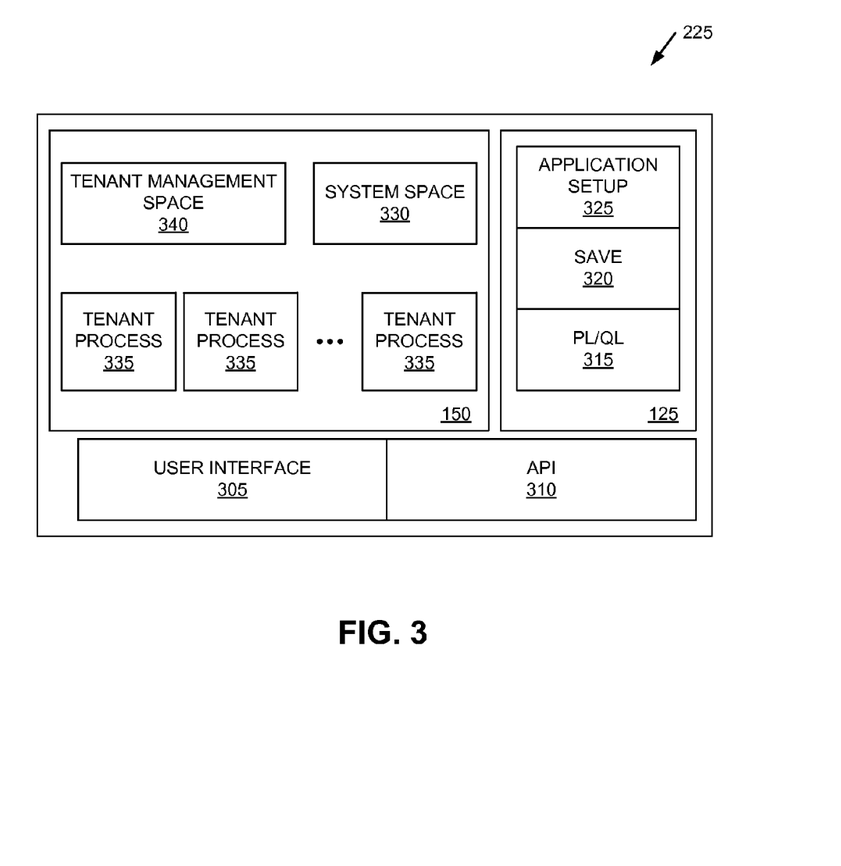
FIG. 3 illustrates a block diagram of an embodiment of the application server of FIG. 2 and various possible interconnections between these elements.
Figure 4:
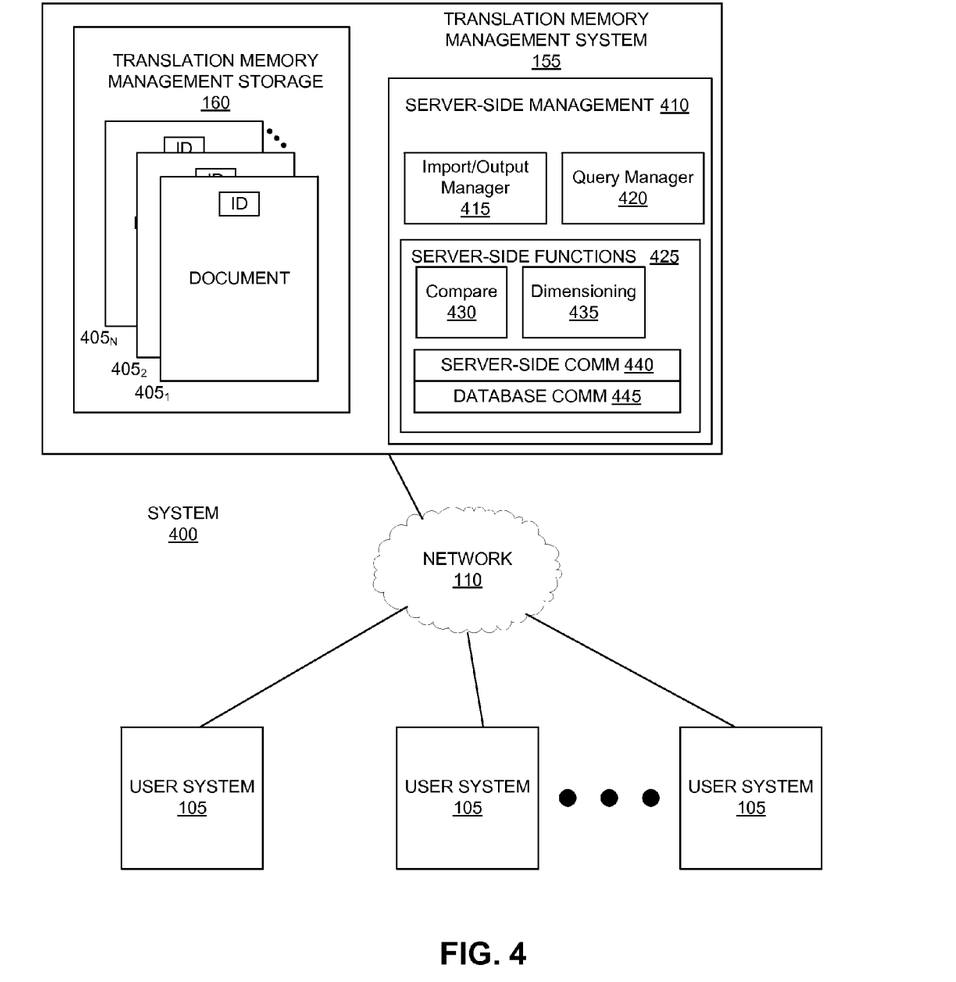
FIG. 4 illustrates a block diagram of an embodiment of system for tracking documents.

FIG. 2, FIG. 3, and FIG. 4 also illustrate portions of environment 100. However, in FIGS. 2-4 elements of system 115 and various interconnections in an embodiment are further illustrated. FIG. 2 shows that user system 105 may include a processor system 205, a memory system 210, an input system 215, and an output system 220. FIG. 2 and FIG. 3 (details of applications server 225) shows a network 110 and system 115. FIG. 2 and FIG. 3 also shows that system 115 may include a tenant data storage 135, a plurality of tenant data 245, a system data storage 140, a plurality of system data 230, a User Interface (UI) 305, an application program interface (API) 310, a PL/QL 315, one or more save routines 320, an application setup mechanism 325, one or more applications servers 225, a system process space 330, a plurality of tenant process spaces 335 (typically one space per active tenant), a tenant management process space 340, a tenant storage area 240 (which may also be referred to as "tenant storage space"), user storage 245 (which may also be referred to as "user data"), and application metadata 250. In other embodiments, environment 100 may not have the same elements as those listed above and/or may have other elements instead of, or in addition to, those listed above.

User system 105, network 110, system 115, tenant data storage 135, and system data storage 140 were discussed above in FIG. 1. Regarding user system 105, processor system 205 may be any combination of one or more processors.

Memory system 210 may be any combination of one or more memory devices, short term, and/or long term memory. Input system 215 may be any combination of input devices, such as one or more keyboards, mice, trackballs, scanners, cameras, and/or interfaces to networks. Output system 220 may be any combination of output devices, such as one or more monitors, printers, and/or interfaces to networks. As shown by FIG. 2, system 115 may include a network interface 130 (of FIG. 1) implemented as a set of HTTP application servers 225, an application platform 125, tenant data storage 135, and system data storage 140. Also shown (FIG. 3) is system process space 330, including individual tenant process spaces 335 and a tenant management process space 340. Each application server 225 may be configured to include tenant data storage 135 and the tenant data 235 therein, and system data storage 140 and the system data 230 therein to serve requests of user systems 105. The tenant data 235 might be divided into individual tenant storage areas 240, which can be either a physical arrangement and/or a logical arrangement of data. Within each tenant storage area 240, user storage 245 and application metadata 250 might be similarly allocated for each user. For example, a copy of a user's most recently used (MRU) items might be stored to user storage 245. Similarly, a copy of MRU items for an entire organization that is a tenant might be stored to tenant storage area 240. UI 305 provides a user interface and API 310 provides an application programmer interface to system 115 resident processes to users and/or developers at user systems 105. The tenant data and the system data may be stored in various databases, such as one or more Mongo® databases available from 10gen, or other similar database systems. Mongo is a distributed document store with "normal" database features such as secondary indexes and query plans. Translation memory elements may be stored in a single Mongo collection using a JSON representation that is standard but flexible with metadata name/value pairs. Property name/value pairs may be indexed in such a way that multiple name/value matches can be made efficiently at query time. Full text search based on exact word matches may also be implemented using Mongo's multikey arrays feature. Scaling of the translation memory management system may be accomplished using Mongo's sharding/clustering (replSet) features.

Application platform 125 includes an application setup mechanism 325 that supports application developers' creation and management of applications, which may be saved as metadata into tenant data storage 135 by save routines 320 for execution by subscribers of one or more tenant process spaces 335 managed by tenant management process space 340 for example. Invocations to such applications may be coded using PL/QL 315 that provides a programming language style interface extension to API 310. Invocations to applications may be detected by one or more system processes, which manage retrieving application metadata 250 for the subscriber making the invocation and executing the metadata as an application in a virtual machine.

Each application server 225 may be communicably coupled to database systems, e.g., having access to system data 230 and tenant data 235, via a different network connection. For example, a first application server 225 might be coupled via the network 110 (e.g., the Internet), a second application server 225 might be coupled via a direct network link, and a third application server 225 might be coupled by yet a different network connection. Transfer Control Protocol and Internet Protocol (TCP/IP) are typical protocols for communicating between application servers 225 and the database system. However, it will be apparent to one skilled in the art that other transport protocols may be used to optimize the system depending on the network interconnect used.

In certain embodiments, each application server 225 is configured to handle requests for any user associated with any organization that is a tenant. Because it is desirable to be able to add and remove application servers from the server pool at any time for any reason, there is preferably no server affinity for a user and/or organization to a specific application server 225. In one embodiment, therefore, an interface system implementing a load balancing function may be communicably coupled between the application servers 225 and the user systems 105 to distribute requests to the application servers 225. In one embodiment, the load balancer may use a least connections algorithm to route user requests to the application servers 225. Other examples of load balancing algorithms, such as round robin and observed response time, also can be used. For example, in certain embodiments, three consecutive requests from the same user could hit three different application servers 225, and three requests from different users could hit the same application server 225. In this manner, system 115 is multi-tenant, wherein system 115 handles storage of, and access to, different objects, data and applications across disparate users and organizations.

As an example of storage, one tenant might be a company that employs a web design team where each member of the team uses system 115 to manage their translations. Thus, a user might maintain documents, source text segments, translated source text segments, translation dimensions, translation vendors, translation project management, all applicable to that user's personal translation process (e.g., in tenant data storage 135). In an example of a MTS arrangement, since all of the data and the applications to access, view, modify, report, transmit, calculate, etc., can be maintained and accessed by a user system having nothing more than network access, the user can manage his or her translation efforts and cycles from any of many different user systems and access the collective translations of others on the design team. For example, a first member of the design team has a first web document translated into a first language. When a second member of the design team desires to have a second web document (perhaps 80% common content with the first web content) translated, the second team member need only have the 20% different content translated. The shared translation memory enables all members of the team to have access to previously translated text segments, thereby saving time and money while improving accuracy and consistency.

While each user's data might be separate from other users' data regardless of the employers of each user, some data might be organization-wide data shared or accessible by a plurality of users or all of the users for a given organization that is a tenant. Thus, there might be some data structures managed by system 115 that are allocated at the tenant level while other data structures might be managed at the user level. Because a MTS might support multiple tenants including possible competitors, the MTS should have security protocols that enable the users to keep data, applications, and application use private and separate. Also, because many tenants may opt for access to a MTS rather than maintain their own system, redundancy, up-time, and backup are additional functions that may be implemented in the MTS. In addition to user-specific data and tenant-specific data, system 115 might also maintain system level data usable by multiple tenants or other data. Such system level data might include industry reports, news, postings, and the like that are sharable among tenants. As noted above, some embodiments permit one tenant to make selected portions of its translation memory available to other tenants, further improving the value of centralized translation memory management to the tenants.

In certain embodiments, user systems 105 (which may be client systems) communicate with application servers 225 to request and update system-level and tenant-level data from system 115 that may require sending one or more queries to tenant data storage 135 and/or system data storage 140. System 115 (e.g., an application server 225 in system 115) automatically generates one or more query statements (e.g., one or more JavaScript Object Notation (JSON) or SQL queries) that are designed to access the desired information. System data storage 140 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

The following detailed description will next describe the server-side system for loading, storing, and querying translation memory. Afterwards a client side method of accessing translation memory will be described.

FIG. 4 shows a block diagram of an embodiment of system 400. System 400 may include translation memory management system 155, which may include translation memory management storage 160 storing a plurality of documents 405 for a plurality of tenants. Translation memory management system 155 may also include a server-side translation memory manager 410 for the translation memory, which in turn may include an import/output manager 415, a query manager 420, and server-side functions 425. Server-side functions 425 may include compare 430 and dimensioning 435, server-side communications 440, and database communications 445. System 400 may also include network 110 and network attached devices like user systems 105, computers, laptops, smartphones, tablet computers, PDAs, and the like. Each document 405 includes or is associated with a plurality of source text segments which are associated with one or more translated text segments. In other embodiments, system 400 may not have all of the elements listed and/or may have other elements instead of or in addition to those listed.

Network 110 was discussed in conjunction with FIGS. 1 and 2. System 400 may be an embodiment of environment 100. Although in this specification, translation memory management system 155 is described as performing various actions, it should be understood that this is a short hand for stating that the action associated with or performed by translation memory management system 155 is performed via system 115. Translation memory management system 155 may manage and access the collective translation memory that is shared by a group of users for each of a group of tenants. Translation memory management storage 160 is a location for storing the collective translation memory to which multiple people need access. Storing the translation memory in translation memory management storage 160 may facilitate ensuring access to a single central repository of all versions of all documents, their source text segments, and all associated translated text segments thereof. Also, translation memory management storage 160 preferably stores historical versions of the translation memory, so that the historical versions are available for access when needed. Additionally, storing the translation memory in translation memory management storage 160 facilitates providing access to those that need access to the translation memory. In an embodiment, translation memory management storage 160 may be tenant data 245 or a location within tenant data 245.

Documents 405 represent the source text segments and associated translated text segments that are the translation memory stored in translation memory management storage 160. Documents 405 may be user created documents, such as web content, marketing e-mails, or sales materials, or other content to be translated from a first language to a second language.

Each element of document 405 may include one or more dimensions within translation memory management system 155. Each dimension is a tag, applied to a document, source text segment, and/or a translated source text segment, that allows a user to improve relevancy of translated content. A problem with many mass translation memory datastores (for example Google Translate, Taus) today is that they lack relevancy, or ways to improve relevancy. Meaning, Google Translate does not offer any way to distinguish between translation memory generated from children's books, recipes, technical specifications, or any other content. And since the key to high quality translation is relevancy (with relevancy determined by factors such as industry, cultural sensitivities, audience age, and the like) without properly dimensioning translation you drastically reduce the effectiveness of using translation memory. Embodiments of the present invention solve this by providing dimension tags, and allowing users to tag translation memory, and limit search results to appropriately tagged content. For instance, some embodiments allow customers to select relevant translation memory based on dimensions such as customer, customer industry, intended use (e.g., marketing, product, legal, investor), date, vendor, project, among many other possible dimensions.

Dimensions are represented by one or more tags that are associated with or added to translation memory elements. Tags may be used for limiting the translation memory that needs to be searched. Tags may be keywords or phrases that one interested in finding particular translation memory is likely to associate with documents 405. Tags are added by the user upon uploading and/or updating translation memory, and may be used as search parameters. The values of tags may be used as values of keys in a database. Using tags may reduce the amount of translation that need to be searched, because only document elements having the tag values of interest need to be accessed.

An embodiment imports and exports using an industry standard format called TMX (translation memory exchange), an open XML standard for the exchange of translation memory data. A current version of TMX is 1.4 b and was promulgated by LISA (Localization Industry Standards Association) available at www.gala-global.org/oscarStandards/tmx/tmx14b.html, the standard hereby expressly incorporated by reference thereto for all purposes. Import/output manager 415 accepts new translation memory in the TMX format and stores it into translation memory management storage 160. Import/output manager 415 intelligently merges new translation memory elements into translation memory management storage 160. This intelligence ensures that all existing dimensions are applied onto newly merged translation memory elements.

Additionally, import manager avoids creating unnecessary duplication of entries in translation memory management storage 160. In translation projects, it is easy for identical copies of documents to be generated by the various processes, and part of the function of import/output manager 415 is to avoid unnecessary duplication. Duplication unnecessarily increases a size of the physical storage which increases costs and slows searching/access. System 400 preferably physically stores each translation memory element, for each tenant, once, and all other exactly matching content is virtually duplicated in translation memory management system 155.

Import/output manager 415 outputs subsets of translation memory management storage 160 as TMX files, based upon desired search criteria that may include one or more selected dimensions.

Query manager 420 provides access plans and efficiently performs block searching of translation memory management storage 160. The queries and search plans allow these subsets of translation memory management storage 160 to be generated. As noted, one or more dimensions may be used in the searches. A physical size of translation memory management storage 160 is always expected to grow larger than any physical memory is reasonably expected to efficiently and economically contain. Bulk streaming is used and the more efficient this searching process, the better the user experience in querying, accessing, and using translation memory management system 155.

Queries are performed against the relevant portion of translation memory management storage, using desired search criteria (that may include one or more dimensions). As noted herein, in some implementations, some or all translation memory elements of multiple tenants may be available to any particular search. Some implementations with this feature may provide a privacy flag or other indicia to enable a user to selectively remove particular content from such universal searches. Of course this paradigm may be reversed and data may be all initially marked private, with a user positively opting-in selected content so it may be included in cross-tenant searches. Query manager 420 ensures that private content is excluded from access by other customers, even when the private content otherwise matches all submitted search criteria.

The content of each document, all source text segments, and all associated translated text segments are searchable. A search result includes all translation memory elements based on matched search criteria. For example: "find me all translation memory elements with Spanish that includes the words "perro negro" somewhere)".

In response to a query from query manager 420, translation memory management system 155 returns TMX with each translation memory element uniquely identified. This enables translation memory management system 155 to update any translation memory element as desired.

Each tenant maintains their own unique translation memory elements. A tenant that happens to have a same translation memory element as another tenant has their own physical copy of such translation memory elements. (That is, identical translation memory elements are not merged/duplicated across tenants as they would be for a single tenant.) Each tenant is able to update/delete translation memory elements that they directly own. When generating a TMX file where translation memory elements with identical content from multiple tenants appear, translation memory management system 155 merges that into a single source segment having multiple associated translated text segments appearing for a given language.

Server-side functions 425 communicate with an application on one of network devices (e.g., user systems 105). Server-side functions 425 receive requests for comparison and dimensioning of translation memory elements.

Compare 312 performs a comparison of some or all of a portion of translation memory management storage 160 to new candidate translation memory elements. When new content is submitted for translation, the user queries the new content against the contents of translation memory management storage. For each "sufficiently matching" translation memory element, translation memory management system 155 provides the user with all previous translations. In this case sufficiently matching includes identical 100% matches, and also fuzzy matches—fuzzy in this context less than identical 100% but greater than a predetermined threshold %). The lower the threshold, the more matches but the results may be less useful, depending upon requirements.

Dimensioning 435 manages the application and search of dimension tags for translation memory elements. Dimensioning 435 not only helps in application of existing dimensions onto newly imported translation memory elements, dimensioning 435 applies new dimensions to all relevant translation memory elements in the entire translation memory management storage 160.

Server-side communications 440 handles communications with user systems 105. Server-side communications 440 may be an interface between server-side manager 410 and network interface 130 and/or application server 225 (FIG. 2).

Database communications 445 handles communications with tenant data storage 135 (FIG. 2). Database communications 445 may be an interface between server-side manager 410 and a database server for tenant data storage 135.

Figure 5:
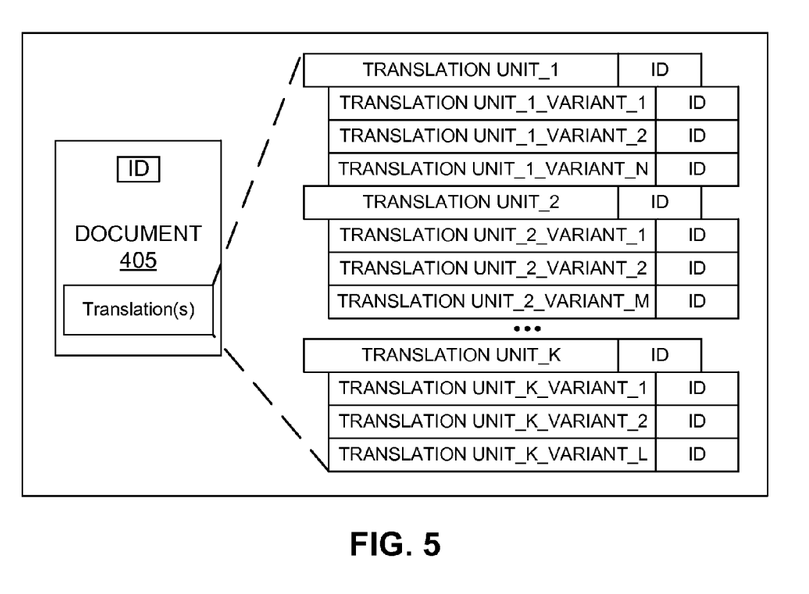
FIG. 5 illustrates an abstraction of the contents of a translation memory management storage.

A simple example is next provided as an aid in understanding the embodiments of the present invention. As noted above, translation memory is the by-product of a translation, the historical record of a translated segment (with a segment generally being an entire sentence, but could be any arbitrary unit). FIG. 5 illustrates an abstraction of the contents of translation memory management storage 160. A document 405 includes some content. In general that content is parsed into source text segments, and typically all source text segments from a single document are in the same source language (but this is not always the case). Each source text segment is translated into an associated translated text segment. Each source text segment may include one or more associated translated text segments. The TMX specification uses different terms. "Translation Unit" is the term for an entire set of source to target segments. "Translation Unit Variant" is an instance of language text, with the source text itself being a Translation Unit Variant.

In FIG. 5, document 405 includes a number K of different source text segments (translation units). Each translation unit may include a different number of translation unit variants, depending upon the languages that the associated source text had been translated into.

Figure 6:
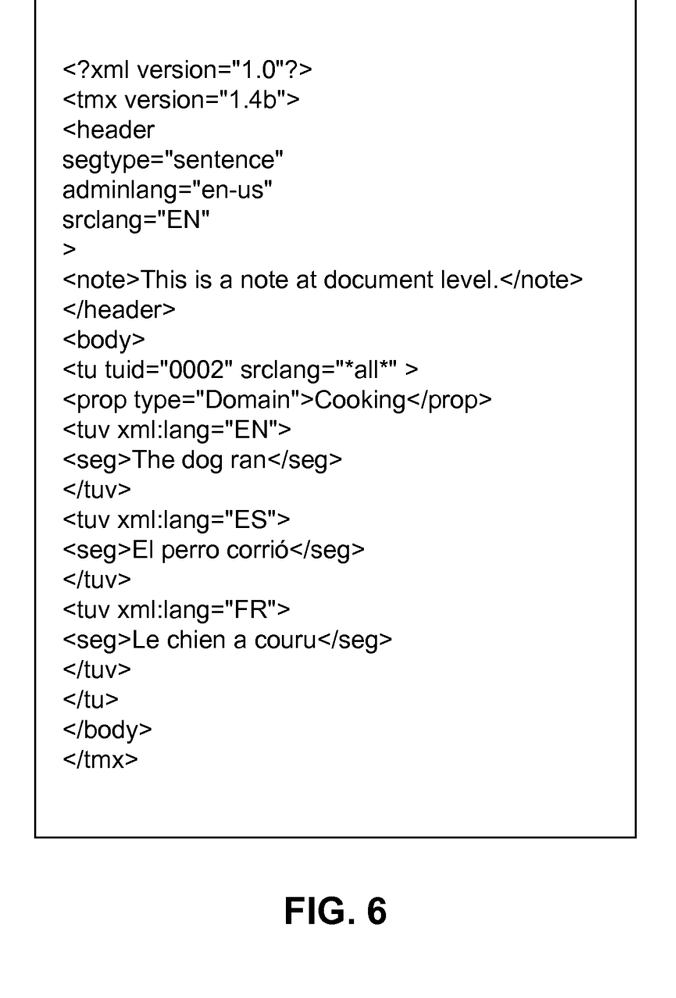
FIG. 6 illustrates an example TMX 1.4 b file.

For instance, the following Table I is an abstracted unit of TM. FIG. 6 illustrates an example TMX 1.4 b file for Table I.

TABLE I

| Language | Content |
|---|---|
| English | The dog ran |
| Spanish | El perro corrió |
| French | Le chien a couru |

Figure 7:
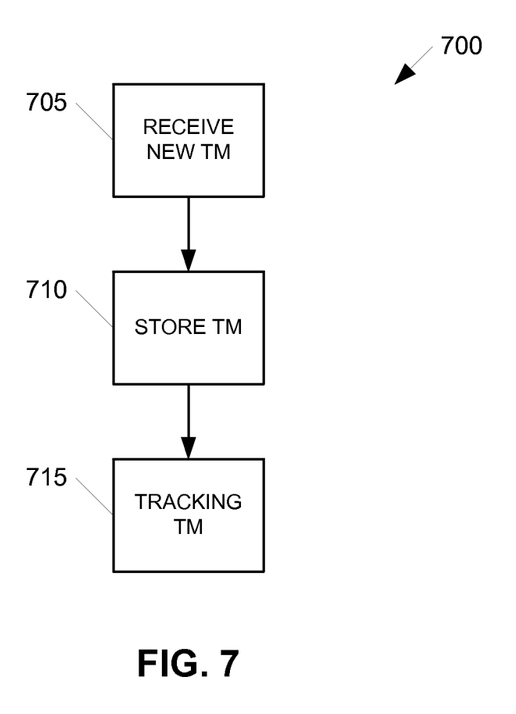
FIG. 7 illustrates a flowchart of an embodiment of a method implemented by a server-side manager.

FIG. 7 illustrates a flowchart of an embodiment of a method 700 implemented by server-side manager 410. In step 705, server-side manager 410 receives new translation memory (TM) from a user. New translation memory may be received in many different ways, and is preferably formatted using the TMX version 1.4 b as described herein. The received translation memory may include a wide range of different content, including: 1) a new document (with new source text segments and one or more new translated text segments to be associated with the source text segments), 2) new translated text segments for one or more source text segments of an existing document, 3) a new document including one or more source text segments matching source text segments from an existing document that may include associated translated text segments in a new language, and/or 4) updates to correct existing translation memory. In some embodiments, step 705 may automatically include a matching search to determine whether any of the received translation memory to be stored has sufficiently matching content already present. Any sufficiently matching content is reported to the user.

Following step 705, method 700 stores the received translation memory at step 710. The manner of storage is dependent upon the type of translation memory received. For the new document (with new source text segments and one or more new translated text segments to be associated with the source text segments) storage is straightforward as all the translation memory is physically stored into translation memory management memory 160, properly keyed, indexed, and dimensioned. An appropriate privacy flag is associated with the new translation memory as it is stored. For new translated text segments for one or more source text segments of an existing document, step 710 also physically stores them into translation memory management memory 160, properly keyed, indexed, and dimensioned. For a new document including one or more source text segments matching source text segments from an existing document that may include associated translated text segments in a new language, existing content (for the particular tenant) is not repeated, but a logical duplication is performed linking the new document to the pre-existing content. Any new translation memory is physically stored as described. For updates to correct existing translation memory, specifically one or more source text segments, either a delete XML attribute is provided or the new translation memory file includes both the new source text segments and associated translated text segments and the old source text segments with a "tombstone" marker to indicate that the segment should be removed. Storing step 710 also applies existing dimensions appropriately to newly received translation memory.

Tracking translation memory step 715 includes the different access modalities. For example, querying, generating, reading, dimensioning, and exporting subsets of translation memory based upon specific criteria (including desired dimensions).

The system and methods above has been described in general terms as an aid to understanding details of preferred embodiments of the present invention. In the description herein, numerous specific details are provided, such as examples of components and/or methods, to provide a thorough understanding of embodiments of the present invention. Some features and benefits of the present invention are realized in such modes and are not required in every case. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed as new and desired to be protected by Letters Patent of the United States is:

1. A method for managing a translation memory for one or more documents stored on behalf of each of a plurality of tenants, comprising: receiving at a host system, a first plurality of source text segments and a first set of translated text segments associated with the first plurality of source text segments to store on behalf of a first tenant with the first plurality of source text segments representing a first document for the first tenant; storing the first plurality of source text segments and its first set of associated translated text segments to a translation memory management storage in a storage accessible to the host system; and tracking, at the host system, the first plurality of source text segments and its first set of associated translated text segments in the translation memory management storage by a unique identifier assigned to each of the first plurality of source text segments and to each of the first set of associated translated text segments stored in the translation memory management storage; wherein the unique identifiers assigned to the first plurality of source text segments and its first set of associated translated text segments stored in the translation memory management storage are tracked using a portion of a database resident at the host system limited to information of the first tenant; allowing a level of access to be granted to the first plurality of source text segments and its first set of associated translated text segments that allows a plurality of users of the first tenant to at least read the first plurality of source text segments and the first set of associated translated text segments.

2. The method of claim 1, further comprising:
representing the one or more documents in an industry-standard translation memory exchange format that permits recreation of the first document from the first plurality of source text segments stored in the translation memory management storage.

3. The method of claim 2, further comprising:
receiving at the host system, a second plurality of source text segments and a first set of translated text segments associated with the second plurality of source text segments to store on behalf of the first tenant with the second plurality of source text segments representing a second document for the first tenant; storing the second plurality of source text segments and its first set of associated translated text segments to the translation memory management storage in the storage accessible to the host system; tracking, at the host system, the second plurality of source text segments and its first set of associated translated text segments in the translation memory management storage by a unique identifier assigned to each of the second plurality of source text segments and to each of its first set of associated translated text segments stored in the translation memory management storage; and merging the first plurality of source text segments and its first set of associated translated text segments with the second plurality of source text segments and its first set of associated translated text segments into a common datastore object.

4. The method of claim 2, further comprising:
receiving at the host system, the first plurality of source text segments and a second set of translated text segments associated with the first plurality of source text segments to store on behalf of the first tenant; associating the second set of associated translated text segments with the corresponding previously stored first plurality of source text segments, storing the second set of associated translated text segments to the translation memory management storage in the storage accessible to the host system associated with the corresponding first plurality of source text segments; tracking, at the host system, the second set of associated translated text segments in the translation memory management storage by a unique identifier assigned to each of the second set of associated translated text segments stored in the translation memory management storage; and merging the first set of associated translated text segments with the second set of associated translated text segments into a common datastore object.

5. The method of claim 1, further comprising:
applying selectively one or more dimensions to each individual source text segment of the first plurality of source text segments; and tagging each of the individual source text segments and each associated translated text segment with the applied one or more dimensions in the translation memory management storage.

6. The method of claim 5 wherein the applying step is performed for the first plurality of source text segments as they are received at the host system.

7. The method of claim 2, further comprising:
applying selectively one or more dimensions to each individual source text segment of the first plurality of source text segments; and tagging each of the individual source text segments and each associated translated text segment with the applied one or more dimensions in the translation memory management storage.

8. The method of claim 7, further comprising:
generating an output data object in the industry-standard translation memory exchange format from a subset of source text segments accessed from the translation memory management storage.

9. The method of claim 8, further comprising
identifying the subset of source text segments responsive to a query identifying a particular one or more dimensions from the one or more dimensions with the subset of source text segments all having a predetermined relationship to the particular one or more dimensions.

10. The method of claim 9 wherein the subset of source text segments is selected from source text segments associated with a single tenant.

11. The method of claim 9 wherein the subset of source text segments is selected from source text segments associated with a plurality of tenants.

12. The method of claim 11, further comprising:
associating a privacy flag with each source text segment stored in the translation memory management storage, the privacy flag identifying one of a public mode for the associated source text segment or a private mode for the associated translation and wherein the subset of source text segments excludes all source text segments having the associated privacy flag identifying the private mode for the associated source text segment even when the excluded source text segment has the predetermined relationship to the particular one or more dimensions.

13. The method of claim 1, further comprising:
searching the first plurality of source text segments and the first associated set of translated text segments using a search criterion, and retrieving a subset of the first plurality of source text segments and the first associated set of translated text segments that have a predetermined relationship to the search criterion.

14. The method of claim 1, further comprising:
receiving at the host system, a second plurality of source text segments representing a second document for the first tenant; searching the source text segments stored in the translation memory management storage using each source text segment of the second plurality of source text segments as a search criterion; and generating an output search data object including each previously stored source text segment and associated translated text segments retrieved from the translation memory management storage and associated with the first tenant that have a predetermined degree of match.

15. The method of claim 3 wherein the plurality of source text segments for the first document are stored before the plurality of source text segments for the second document and wherein each source text segment associated with both the first document and the second document for the first tenant is physically stored as a single source text segment in the translation memory management storage with source text segments of the second document matching source text segments of the first document logically duplicated against the previously stored source text segments when stored into the translation memory management storage.

16. The method of claim 15 wherein the single source text segment includes a first associated translated text segment from the first document and a second associated translated text segment from the second document different from the first associated translated text segment wherein the second associated translated text segment is physically stored in the translation memory management storage.

17. The method of claim 16 wherein a query process merges each source text segment from the first document that matches a source text segment from the second document into a single query result that includes the matching source text segment, the first associated translated text, and the second associated translated text.

18. The method of claim 2 wherein the representation of the one or more documents for a particular one tenant, excludes duplicated elements from among translation elements owned by the particular one tenant.

19. The method of claim 8 further comprising reassembling the output data object wherein one or more identical source text segments from a first document and a second document are combined into a single source text document for the output data object.

20. A non-transitory computer readable medium storing thereon one or more instruction for implementing a method for accessing translation memory stored on behalf of a plurality of tenants, the method of claim 1.

21. A host system for accessing translation memory stored on behalf of a plurality of tenants, the system comprising: a database system having a processor system, volatile memory, and non-volatile memory; the non-volatile memory including at least one machine readable medium carrying one or more sequences of instructions for which when implemented causes the processor system to implement the method of claim 1.

22. A method for accessing source text segments and associated translated text segments stored on behalf of a plurality of tenants, comprising: sending, from a host, a user interface associated with translation memory management software to a client system, the user interface having one or more links which when activated cause the generation of database commands at the host, the host being a multi-organizational on-demand database resident at the host system; as a result of input received via the user interface, receiving at a host system, an original document, its source text segments and associated translated text segments to store on behalf of a first tenant; storing the original document, its source text segments and associated translated text segments to a translation memory management storage in a storage accessible to the host system; and tracking, at the host system, the original document, its source text segments and associated translated text segments in the translation memory management storage by a unique identifier assigned to the original document and a corresponding unique identifier assigned to each of the source text segments and associated translated text segments stored in the translation memory management storage; wherein the unique identifier assigned to source text segments and translated text segments stored in the translation memory management storage is tracked using a portion of a database resident at the host system limited to information of the first tenant.

* * * * *